US009745469B2

(12) United States Patent
Mulholland

(10) Patent No.: US 9,745,469 B2
(45) Date of Patent: Aug. 29, 2017

(54) MOLDED ARTICLES HAVING A SWIRL-LIKE OR MARBLE-LIKE APPEARANCE AND COMPOSITIONS FOR PRODUCING SAME

(71) Applicant: Ticona LLC, Florence, KY (US)

(72) Inventor: Bruce M. Mulholland, Hebron, KY (US)

(73) Assignee: Ticona LLC, Florence, KY (US)

( * ) Notice: Subject to any disclaimer, the term of this patent is extended or adjusted under 35 U.S.C. 154(b) by 137 days.

(21) Appl. No.: 14/808,404

(22) Filed: Jul. 24, 2015

(65) Prior Publication Data
US 2015/0329720 A1 Nov. 19, 2015

Related U.S. Application Data

(62) Division of application No. 13/080,364, filed on Apr. 5, 2011, now Pat. No. 9,090,769.

(51) Int. Cl.
C08L 59/00 (2006.01)
C08L 77/06 (2006.01)
C08L 67/02 (2006.01)
C08L 59/02 (2006.01)

(52) U.S. Cl.
CPC .............. *C08L 77/06* (2013.01); *C08L 59/02* (2013.01); *C08L 67/02* (2013.01); *C08L 67/025* (2013.01); *C08L 2207/02* (2013.01)

(58) Field of Classification Search
CPC ......... C08L 59/02; C08L 67/025; C08L 77/06
USPC ................................ 523/171; 524/538, 539
See application file for complete search history.

(56) References Cited

U.S. PATENT DOCUMENTS

| | | | |
|---|---|---|---|
| 3,377,313 A | 4/1968 | Jupa et al. | |
| 3,637,575 A | 1/1972 | Fischer et al. | |
| 3,658,749 A | 4/1972 | Gordon | |
| 3,704,275 A | 11/1972 | Burg et al. | |
| 3,795,715 A | 3/1974 | Cherdron et al. | |
| 3,969,313 A | 7/1976 | Aishima et al. | |
| 3,980,734 A | 9/1976 | Burg et al. | |
| 4,125,582 A | 11/1978 | Langlois | |
| 4,169,867 A | 10/1979 | Burg et al. | |
| 4,183,673 A | 1/1980 | Easley et al. | |
| 4,391,741 A | 7/1983 | Masamoto et al. | |
| 4,556,690 A | 12/1985 | Nakagawa | |
| 4,645,785 A | 2/1987 | Heinz et al. | |
| 4,670,508 A | 6/1987 | Ohdaira et al. | |
| 4,911,963 A | 3/1990 | Lustig et al. | |
| 4,975,478 A | 12/1990 | Okuda | |
| 5,047,471 A | 9/1991 | Burg et al. | |
| 5,053,176 A | 10/1991 | Cameron et al. | |
| 5,079,282 A | 1/1992 | Okuda | |
| 5,118,734 A | 6/1992 | Katsumata | |
| 5,141,993 A | 8/1992 | Siol et al. | |
| 5,171,770 A | 12/1992 | Nakagawa | |
| 5,191,011 A | 3/1993 | Tajima et al. | |
| 5,237,008 A | 8/1993 | Kosinski | |
| 5,244,946 A | 9/1993 | Guest et al. | |
| 5,340,877 A | 8/1994 | Schleith et al. | |
| 5,387,381 A | 2/1995 | Saloom | |
| 5,389,381 A | 2/1995 | Phillips et al. | |
| 5,489,656 A | 2/1996 | Ohtsuka et al. | |
| 5,984,556 A | 11/1999 | Gray et al. | |
| 6,046,265 A | 4/2000 | Clark et al. | |
| 6,306,940 B1 | 10/2001 | Disch et al. | |
| 6,421,486 B1 | 7/2002 | Daneshvar et al. | |
| 6,512,047 B2 | 1/2003 | Kim et al. | |
| 7,781,562 B2 | 8/2010 | Crawford et al. | |
| 2001/0045680 A1 | 11/2001 | Blasius et al. | |
| 2005/0107513 A1 | 5/2005 | Papke | |
| 2007/0060715 A1 | 3/2007 | Muck et al. | |
| 2007/0202332 A1 | 8/2007 | Gunnewig et al. | |
| 2007/0276064 A1 | 11/2007 | Papke | |
| 2008/0182966 A1 | 7/2008 | Mück et al. | |
| 2008/0242800 A1 | 10/2008 | Disch et al. | |

(Continued)

FOREIGN PATENT DOCUMENTS

DE 1 933 570 1/1971
EP 0 931 807 7/1999

(Continued)

OTHER PUBLICATIONS

Designing with Delcon, Celanese (2002).*
International Search Report and Written Opinion, PCT/US2012/030500, dated Mar. 26, 2012.
"Thermoplastic elastomer," http://en.wikipedia.org/wiki/Thermoplastic_elastomer, at least as early as Aug. 30, 2010
"Thermoplastic Polyester Elastomer TPEE," Gromax Enterprises Corp. publication.
"Thermoplastic Polyether-Ester Elastomer (TPEE)," Chengdu Polyster Co., Ltd., http://www.tootoo.com/d-rp15133600-Thermoplastic_Polyether_Ester_elastomer_TPEE_/, at least as early as Aug. 30, 2010.
"Splash Special Effects Concentrates"—Clariant Masterbatches Div. product; Product Description, 2005.

(Continued)

*Primary Examiner* — Edward Cain
(74) *Attorney, Agent, or Firm* — Dority & Manning, P.A.

(57) ABSTRACT

Polymer compositions are described that contain at least two different immiscible phases for producing molded articles having a swirl-like or marble-like appearance. The first phase, for instance, may contain one or more polyoxymethylene polymers. The second phase, on the other hand, contains one or more polymers that together have a melting point that is from about 5° to about 30° different than the melting point of the polyoxymethylene polymer. In one embodiment, the second phase may contain a thermoplastic elastomer, a glycol-modified polyethylene terephthalate, or a polyimide and may have a melting point that is higher than the melting point of the polyoxymethylene polymer. The second phase is present in the polymer composition in relatively low amounts, such as in amounts less than about 5% by weight. The second phase can contain a high concentration of colorants that creates a contrast of colors when the molded article is produced.

20 Claims, No Drawings

(56) References Cited

U.S. PATENT DOCUMENTS

2008/0287580 A1 11/2008 Disch et al.
2009/0264583 A1 10/2009 Kurz et al.
2009/0317649 A1 12/2009 Smith

FOREIGN PATENT DOCUMENTS

| GB | 265005 | 2/1927 |
| JP | 58055234 | 4/1983 |
| JP | 6255294 | 9/1994 |
| JP | 8208919 | 8/1996 |
| JP | 9031207 | 2/1997 |
| JP | 11268470 | 10/1999 |
| JP | 2005187591 | 7/2005 |
| WO | WO 92/13921 | 8/1992 |
| WO | WO 97/37825 | 10/1997 |
| WO | WO 2007035371 | 3/2007 |

OTHER PUBLICATIONS

Handbook of Thermoplastic Polyester, vol. 1, pp. 581-583, Wiley-VCH, Weinheim, 2002.
Dupont-Hytrel Technical Bulletin, http://www.distrupol.com/images/Hytrel(TM)-_Injection_Molding_Guide.pdf.
Habisat, POM melting point information, http://www.habasit.com/en/pom.htm.
Takamatsu et al., Morphology of polyoxyethylene-based polymer alloys, Polymer vol. 35, Issue 17, Aug. 1994, pp. 3598-3603.
Blueridge Films, Inc., Plastic Films Technical Information, http://www.blueridgefilms.com/plastic_films.html.
Dupont, Hytrel Product Information, http://www2.dupont.com/Plastics/en_US/assets/downloads/processing/236359a.pdf.

\* cited by examiner

MOLDED ARTICLES HAVING A SWIRL-LIKE OR MARBLE-LIKE APPEARANCE AND COMPOSITIONS FOR PRODUCING SAME

RELATED APPLICATIONS

The present application is a divisional application of U.S. application Ser. No. 13/080,364, filed on Apr. 5, 2011, which is incorporated herein by reference in its entirety.

BACKGROUND

Structural polymers such as plastic materials are used in numerous and diverse applications. In fact, those skilled in the art continue to strive to replace parts conventionally made from metal and wood with those made from polymers. The polymers, for instance, may offer various advantages with respect to strength properties, chemical resistance, and/or cost.

One problem that has been encountered in producing molded polymer articles, however, is the ability to produce articles with a distinctive look or appearance. For instance, molded polymer articles are generally uniform in color. In certain applications, however, multi-colored parts are desired. Thus, in the past, non-dispersing pigments or pigment particles have been incorporated into polymers in order to produce articles having contrasting colors. Such non-dispersing pigments, for instance, have been used to produce speckled surfaces or parts having a tortoise-like appearance. Processes for producing molded articles having contrasting color properties are disclosed, for instance, in European Patent Application No. EP 0931807, International PCT Application Publication No. WO 97/37825, U.S. Pat. No. 4,125,582, U.S. Pat. No. 4,183,673, U.S. Pat. No. 5,053,176, U.S. Pat. No. 5,489,656, and U.S. Patent Application Publication No. 2001/0045680, which are all incorporated herein by reference.

When attempting to produce molded polymer articles having multiple colors, however, problems have been experienced in producing articles with the desired effect without adversely impacting other properties of the polymer. For instance, producing polymer articles with multiple colors can adversely impact upon the strength of the resulting material depending upon the mixture of materials that are used to produce the part.

One particular type of structural polymer that has good rigidity and strength properties are polyoxymethylene polymers. Polyoxymethylene (which is also referred to as "POM") is a high-performance polymer having good mechanical properties. Due to its properties, polyoxymethylene polymers are commonly used as a direct replacement for metals due to its stiffness, dimensional stability, and corrosion resistance. Polyoxymethylene polymers exist in the form of homopolymers and copolymers.

Although polyoxymethylene polymers have a desirable combination of physical properties, various problems have been encountered in attempting to produce multi-colored articles containing a polyoxymethylene polymer. In particular, the problems described above have been particularly problematic when processing polyoxymethylene polymers. Thus, a need currently exists for a polymer composition and method capable of producing multi-colored articles from polyoxymethylene polymers.

SUMMARY

In general, the present disclosure is directed to the production of molded polymeric articles that can have a multi-colored appearance and predominately contain a polyoxymethylene polymer. Of particular advantage, the polyoxymethylene polymer articles can be produced with contrasting colors without any substantial adverse impacts upon the strength of the resulting material.

In one embodiment, for instance, the present disclosure is directed to a molded polymer article that is made from a two-phase polymer composition. The first phase of the composition is immiscible with a second phase. In this regard, the first phase remains distinct from the second phase when the composition is molded into the article. In one embodiment, the first phase comprises a polyoxymethylene polymer. The second phase, on the other hand, comprises a thermoplastic, semi-crystalline polymer. In accordance with the present disclosure, the thermoplastic, semi-crystalline polymer has a melting point that is at least 5° higher or lower, such as from about 10° C. to about 30° C. higher or lower than the melting point of the polyoxymethylene polymer. In one particular embodiment, for instance, the thermoplastic, semi-crystalline polymer has a melting point that is higher than the melting point of the polyoxymethylene polymer.

In one embodiment, the first phase may have a different color than the second phase. In this manner, when the two phases are combined together, the resulting molded polymer article can have a swirl-like appearance or a marble-like appearance depending upon the relative amounts and the manner in which the phases are combined.

In one embodiment, the thermoplastic, semi-crystalline polymer comprises a thermoplastic elastomer, a glycol-modified polyethylene terephthalate copolymer, or a polyamide. For example, in one particular embodiment, the second phase may contain a thermoplastic polyester elastomer.

The polyoxymethylene polymer contained in the first phase may have a melting point that is lower than the melting point of the polymer contained in the second phase. The polyoxymethylene polymer, for instance, may have a melting point of from about 150° C. to about 200° C. The thermoplastic, semi-crystalline polymer contained in the second phase, on the other hand, may have a melting point of from about 170° C. to about 210° C., such as from about 185° C. to about 200° C.

In order for the second phase to have a desired color and contrast with the first phase, the second phase may contain a colorant such as a pigment if desired. For instance, at least one colorant may be present in the second phase in an amount from about 1% to about 60% by weight of the second phase.

The relative amount of the first phase in comparison to the second phase can vary depending upon the particular application and the desired result. In general, the polymer composition may contain the second phase in an amount of from about 0.5% to about 10% by weight, such as from about 1% to about 5% by weight. The relative amount of the phases may have an impact on the resulting appearance of the molded article. In one embodiment, for instance, the molded article may have a swirl-like design. Alternatively, the molded article may have a marble-like appearance. In one particular embodiment, the first phase and the second phase may have different but complementary colors such that the first and second phases produce a camouflage pattern in the final product.

The polymer composition can be used in any suitable molding process to produce articles. For instance, the composition can be used in a blow molding process or in an injection molding process.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to polymer compositions and molded articles that include at least two distinct phases. The first phase comprises one or more polyoxymethylene polymers. The second phase, on the other hand, comprises a thermoplastic, semi-crystalline polymer that is immiscible with the first phase. The polymer composition has many different uses and applications. In one particular embodiment, one or more colorants can be incorporated into the second phase and/or the first phase so that the phases have different colors. In this manner, a multi-colored article can be produced. Depending upon the relative amounts of the phases and the manner in which the phases are mixed, for instance, a molded article can be produced that has a swirl-like appearance, a marble-like appearance, or the like. In this manner, products can be produced having a very decorative appearance. In addition, products can be produced having a camouflage-like pattern or can be produced that imitate natural materials, such as wood, marble or granite.

Of particular advantage, multi-phase molded articles can be made according to the present disclosure without significantly adversely affecting the strength of the polyoxymethylene polymer. In one embodiment, for instance, a higher melting point polymer is used as the color concentrate resin that is combined with the polyoxymethylene polymer. The higher melting point polymer, for instance, may contain relatively high amounts of colorant while being combined with the polyoxymethylene polymer in relatively low amounts. In some applications, the impact strength resistance of the resulting product may actually be increased in relation to a similar product made exclusively from the polyoxymethylene polymer.

The polyoxymethylene polymer that comprises the first phase of the polymer composition may comprise any suitable homopolymer or copolymer of polyoxymethylene. Polyoxymethylenes are generally unbranched linear polymers that may contain at least 80%, such as at least 90% oxymethylene units ($—CH_2—O—$). The homopolymers are generally obtained by polymerizing formaldehyde or trioxane, wherein the polymerization is initiated cationically or anionically. Copolymers of polyoxymethylenes may contain not only oxymethylene units but also oxyakylene units, where the alkylene groups may contain from about 2 to about 8 carbon units, linear or branched. The term polyoxymethylenes as used herein encompasses homopolymers of formaldehyde or its cyclic oligomers, such as trioxane or tetroxane, and also corresponding copolymers.

Homopolymers of formaldehyde or of trioxane are polymers whose hydroxy end groups have been chemically stabilized in a known manner with respect to degradation, e.g. via esterification or via etherification. Copolymers are polymers composed of formaldehyde or of its cyclic oligomers, in particular trioxane, and of cyclic ethers, of cyclic acetals, and/or of linear polyacetals.

These POM homo- or copolymers are known per se to the person skilled in the art and are described in the literature.

Very generally, these polymers have at least 50 mol % of $—CH_2—O—$ repeat units in the main polymer chain. The homopolymers are generally prepared via polymerization of formaldehyde or trioxane, preferably in the presence of suitable catalysts.

POM copolymers are preferred in the inventive molding compositions, particularly those which also contain, besides the —CH2-O— repeat units, up to 50 mol %, preferably from 0.1 to 20 mol %, and in particular from 0.5 to 10 mol %, of $—O—R^1—$ repeat units, where $R^1$ is a saturated or ethylenically unsaturated alkylene group having at least two carbon atoms, or a cycloalkylene group, which, if appropriate, has sulfur atoms or preferably oxygen atoms in the chain, and which, if appropriate, bears one or more substituents selected from the group consisting of alkyl, cycloalkyl, aryl, aralkyl, heteroaryl, halogen, or alkoxy.

$R^1$ is preferably a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms, or a group of the formula $—((C_nH_{2n})—O—)_m$, in which n is a whole number from 2 to 4 and m is 1 or 2.

These groups can advantageously be introduced into the copolymers via ring-opening of cyclic ethers and/or acetals. Preferred cyclic ethers or acetals are those of the formula

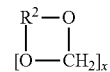

in which x is 0 or 1 and $R^2$ is a $C_2$-$C_4$-alkylene group or an alkyleneoxyalkylene unit which, if appropriate, have one or more substituents which are $C_1$-$C_4$-alkyl groups, or which are $C_1$-$C_4$-alkoxy groups, and/or which are halogen atoms, preferably chlorine atoms.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

It is particularly advantageous to use copolymers composed of from 99.5 to 95 mol % of trioxane and of from 0.5 to 5 mol % of one of the above-mentioned comonomers.

Other polyoxymethylenes likewise suitable are oxymethylene terpolymers which by way of example are prepared via reaction of trioxane and of one of the cyclic ethers or acetals described above, and using a third monomer, preferably a bifunctional compound of the formula

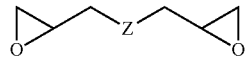

where Z is a chemical bond, —O—, or —O—$R^3$—O— ($R^3$=$C_2$-$C_8$-alkylene or $C_2$-$C_8$-cycloalkylene).

Preferred monomers of this type are ethylene diglycide, diglycidyl ether and diethers composed of glycidyl compounds and formaldehyde in a molar ratio of 2:1, and also diethers composed of 2 mol of glycidyl compound and 1 mol of an aliphatic diol having from 2 to 8 carbon atoms, examples being the diglycidyl ether of ethylene glycol, 1,4-butanediol, 1,3-butanediol, 1,3-cyclobutanediol, 1,2-propanediol, and 1,4-cyclohexanediol, and also diglycerol diformal, to mention just a few examples.

Processes for preparation of the POM homo- and copolymers described above are known to the person skilled in the art and are described in the literature.

In one embodiment, the preparation of the polyoxymethylene can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in the melt. Initiators which may be used are the compounds known per se, such as trifluoromethane sulfonic acid, these preferably being added as solution in ethylene glycol to the monomer. The procedure and termination of the polymerization and working-up of the product obtained can be effected according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art.

The melting point of the polyoxymethylene polymer (or blend of polymers) can vary depending upon how the polymer is made, its molecular weight, and various other factors. In one embodiment, for instance, the melting point can be from about 150° C. to about 200° C. The weight average molecular weight of the polymer can vary from about 5000 to about 200,000, such as from about 7000 to about 150,000.

The polyoxymethylene polymer present in the composition can generally have a melt volume rate (MVR) of less than 50 cm$^3$/10 min, such as from about 0.5 to about 20 cm$^3$/10 min, such as from about 2 to about 15 cm$^3$/10 min. In one particular embodiment, for instance, the MVR may be from about 6 to about 12 cm$^3$/10 min, determined according to ISO 1133 at 190° C. and 2.16 kg.

The polyoxymethylene polymer selected for use in the first phase of the polymer composition generally comprises a polymer having a desired melting point and physical properties. In addition, the polymer should also not chemically react or otherwise couple to the immiscible polymer contained in the second phase. In this regard, the polymer composition generally does not contain any compatibilizers or coupling agents, i.e. non-compatibilized.

The amount of polyoxymethylene polymer present in the polymer composition of the present disclosure can vary depending upon the particular application. In one embodiment, for instance, the composition contains polyoxymethylene polymer in an amount of at least 70% by weight, such as in an amount greater than about 80% by weight, such as in an amount greater than about 90% by weight, such as in an amount greater than about 95% by weight. In general, the polyoxymethylene polymer is present in an amount less than about 99% by weight, such as in an amount less than about 98% by weight, such as in an amount less than about 97% by weight.

In addition to a polyoxymethylene polymer contained in the first phase, the polymer composition also includes a second phase containing a thermoplastic, semi-crystalline polymer. The thermoplastic, semi-crystalline polymer contained in the second phase comprises a polymer that is immiscible with the polyoxymethylene polymer. In addition, the polymer in the second phase has a melting point that is higher or lower than the melting point of the polyoxymethylene polymer. For instance, the melting point of the thermoplastic, semi-crystalline polymer can be at least 5° C. greater or less than the melting point of the polyoxymethylene polymer, such as from about 10° C. to about 30° C. higher or lower than the melting point of the polyoxymethylene polymer. In one particular embodiment, the thermoplastic, semi-crystalline polymer has a melting point that is higher than the melting point of the polyoxymethylene polymer.

For instance, in one embodiment, the polymer contained in the second phase comprises a thermoplastic elastomer. Examples of thermoplastic elastomers are polyester elastomers (TPE-E), thermoplastic polyimide elastomers (TPE-A) and thermoplastic polyurethane elastomers (TPE-U). In general, a thermoplastic elastomer is selected that has a desired melting point in comparison to the melting point of the polymers contained in the first phase. In addition, the thermoplastic elastomer should be immiscible with respect to the polyoxymethylene polymer. Thus, a thermoplastic elastomer can be selected that does not chemically react or otherwise couple to the polyoxymethylene polymer.

In one particular embodiment, one or more thermoplastic elastomers are blended to form the second phase of the polymer composition that have an overall melting temperature that is higher than the melting temperature of the first phase polymers. For instance, in one embodiment, a thermoplastic polyester elastomer having a melting point of about 170° C. may be blended with a thermoplastic polyester elastomer having a melting point of about 200° C. in order to form the second phase that overall has a melting point that is from about 10° C. to about 30° C. higher than the melting point of the polyoxymethylene polymers present in the first phase.

In addition to or instead of a thermoplastic elastomer, the second phase can also contain various other thermoplastic, semi-crystalline polymers. For instance, in an alternative embodiment, the second phase may contain a polyethylene terephthalate copolymer having the desired melting point with respect to the first phase polymers. For instance, in one embodiment, the second phase may contain a glycol-modified polyethylene terephthalate copolymer. For instance, the copolyester may contain polyethylene terephthalate copolymerized with cyclohexane dimethanol. Such polymers can have a melting point of from about 170° C. to about 215° C., such as from about 170° C. to about 210° C.

In yet another embodiment, the second phase may contain a polyamide polymer. Polyamide polymers are generally immiscible with polyoxymethylene polymers and can have a melting point higher than many polyoxymethylene polymers. For instance, in one embodiment, the polyamide polymer comprises nylon 11. Nylon 11, for instance, can have a melting point of from about 175° C. to about 200° C., such as from about 180° C. to about 190° C.

In another embodiment, the polyamide polymer may comprise nylon 12.

In addition to a thermoplastic, semi-crystalline polymer, the second phase of the polymer composition may also contain one or more colorants. Colorants can be included in the second phase depending upon the desired color and the final application for the polymer.

The colorants used may be any desired inorganic pigments, such as titanium dioxide, ultramarine blue, cobalt blue, etc., or organic pigments or colors, such as phthalocyanines, anthraquinones, etc., or special effects pigments such as pearlescent pigments, aluminum based pigments, fluorescent pigments and the like, or carbon black, either individually or as a mixture, or together with polymer-soluble dyes.

The amount of colorants present in the second phase of the polymer composition can depend upon the particular application. In general, colorants may be present in the second phase in an amount from about 1% to about 60% by weight, based upon the weight of the second phase. In certain embodiments, in order to have significant color differences between the first phase and the second phase, the second phase may contain colorants in amounts greater than 10% by weight, such as in amounts greater than 20% by weight, such as in amounts greater than 30% by weight, such as in amounts greater than 40% by weight, such as even in amounts greater than 50% by weight, based upon the weight of the second phase. It was discovered that significant amounts of colorant can be included in the second phase in order to improve the overall appearance of the resulting product without significantly decreasing the strength, such as the impact strength of the product.

In addition to being contained in the second phase, the above colorants may also be added to the first phase if desired. For instance, colorants may be combined with the polyoxymethylene polymers in amounts up to about 10% by weight, such as from about 0.1% to about 5% by weight.

In general, the polymer composition predominately comprises the first phase. For instance, the second phase may be present in the polymer composition in an amount less than 10% by weight, such as in an amount from about 1% to about 5% by weight.

The polymer composition of the present disclosure can optionally contain a stabilizer and/or various other known additives. Such additives can include, for example, antioxidants, acid scavengers, formaldehyde scavengers, UV stabilizers or heat stabilizers. In addition, the molding material or the molding may contain processing auxiliaries, for example adhesion promoters, lubricants, nucleating agents, demolding agents, fillers, reinforcing materials or antistatic agents and additives which impart a desired property to the molding material or to the molding, such as dyes and/or pigments and/or further impact modifiers and/or additives imparting electrical conductivity; and mixtures of these additives, but without limiting the scope to said examples.

In general, other additives can be present in the polymer composition in an amount up to about 10% by weight, such as from about 0.1% to about 5% by weight, such as from about 0.1 to about 2% by weight.

Molded articles can be made in accordance with the present disclosure using various methods and techniques. In particular, articles can be made using any suitable extrusion process. In one embodiment, for instance, molded articles can be produced using injection molding.

During injection molding, barrel temperatures, compression ratio of the screw, residence time of the material through the barrel, and degree of mixing in the barrel can be controlled so as to produce a product having the desired properties and appearance.

For example, the stock temperature of the material as controlled by barrel temperatures and shear heating can be kept close to the minimum recommended temperature for the first phase polymer. Elevated temperatures effectively reduce the delta temperature (melting point of second phase minus actual material temperature of first phase) between the two phases and may yield a less desirable appearance, particularly if the delta temperature approaches 5° C. or less.

Compression ratio of the screw used in the barrel of the injection molding machine may range up to 3:1, and preferably 2.5:1 or less. Compression ratios of less than 2.5:1 will yield desirable molded part appearance at lower the lower range of melting point differences.

Sizing of the barrel to the shot size of the molded article may be used to control the desired appearance. Shot size refers to the amount of polymer it takes to fill the mold for producing a part. Shot size can vary dramatically between processes and systems. Barrel capacity of 6 shots or less, and preferably 3 shots or less, is desirable. Higher barrel capacity leads to longer residence times and less differentiated swirl patterns.

Finally, degree of mixing in the barrel of the injection molding machine is also controlled by the screw speed and back pressure. It is common practice and knowledge that if less mixing is desired, a slower screw rotation along with low back pressure should be employed. However, when attempting to produce swirl-like patterns, fast screw rotation is preferred to minimize screw rotation time, which minimizes mixing and maximizes the swirl pattern. Low back pressure is desirable. For example, if the mold closed time is 20 seconds, it is common practice to utilize most of the 20 seconds with screw rotation at the slowest speed possible to reduce mixing. In contrast, the preferred method is fast screw rotation (less than 5 second screw rotation time) to maximize the swirl-like pattern.

Changing the above factors, for instance, can create the difference between little to no swirl or marble effect, to a highly desirable swirl or marble pattern.

The present disclosure may be better understood with reference to the following example.

EXAMPLE

The following experiment was conducted in order to show some of the benefits and advantages of the present invention.

In this example, a polymer composition was formulated in accordance with the present disclosure. The polymer composition included a first phase and a second phase.

The first phase contained a polyoxymethylene copolymer. The polyoxymethylene copolymer had a melting point of about 170° C. and is commercially available from the Celanese Corporation.

The second phase, on the other hand, contained one or more thermoplastic polyester elastomer polymers, which are also commercially available from the Celanese Corporation having different melting points.

The colorants used were inorganic pigments.

More particularly, the following compositions were formulated and the following results were obtained with respect to swirl effect and part integrity.

|  | Melting Point | Example 1 | Example 2 | Example 3 |
| --- | --- | --- | --- | --- |
| Colorant Phase |  |  |  |  |
| TPE Resin 1 | 171° C. | 50% | 10% | 10% |
| TPE Resin 2 | 200° C. |  | 40% |  |
| TPE Resin 3 | 210° C. |  |  | 40% |
| Colorants |  | 50% | 50% | 50% |
| Blended resin |  |  |  |  |
| POM Resin 1 | 170° C. | 98% | 98% | 98% |
| Colorant Phase |  | 2% | 2% | 2% |
| Swirl effect | 1 (least)-5 (most) | 1 | 5 | 3 |
| Part integrity | 1 (breaks)-5 (no break) | 5 | 5 | 2 |

A prototype automotive grab handle was then molded using injection molding into a two-cavity tool. Material temperature of 185° C. was used in molding.

The machine was equipped with a 2.5:1 compression ratio screw. The residence time in the barrel was controlled by a capacity of approximately 6 shots in the barrel. Fast screw rotation (<1.5 seconds) was utilized to maximize the swirl effect. Example 2 above showed the best balance of degree of swirl and part integrity for the particular application.

The embodiment of Example 2 was molded into a gun rest part under a commercial process. Material temperature was 185° C., the compression ratio of the screw was 2.5:1, and the barrel capacity was approximately at 3.5 shots. Again fast screw rotation was employed. Example 2 produced parts that had a swirled appearance due to the manner in which the second phase was combined with the first phase. Overall, the gun rest parts exhibited a camouflage pattern.

To further illustrate the present disclosure, examples 4, 5 and 6 were included using a different polymer system. The first phase contained a thermoplastic polyester elastomer, commercially available from the Celanese Corporation, with a melting point of about 187° C.

The second phase contained one or more thermoplastic polyester elastomer polymers, which are also commercially available from the Celanese Corporation having different melting points.

The colorants used were again inorganic pigments.

|  | Melting Point | Example 4 | Example 5 | Example 6 |
|---|---|---|---|---|
| Colorant Phase |  |  |  |  |
| TPE Resin 1 | 171° C. | 50% | 10% | 10% |
| TPE Resin 2 | 200° C. |  | 40% |  |
| TPE Resin 3 | 210° C. |  |  | 40% |
| Colorants |  | 50% | 50% | 50% |
| Blended resin |  |  |  |  |
| TPE Resin 4 | 187° C. | 98% | 98% | 98% |
| Colorant Phase |  | 2% | 2% | 2% |
| Swirl effect | 1 (least)-5 (most) | 1 | 5 | 3 |

Examples 4, 5 and 6 were injection molded into 100 mm×150 mm×3 mm plaques using a material temperature of 193° C., the compression ratio of the screw was 2.5:1 and the barrel capacity was approximately at 4 shots. Again fast screw rotation was employed. Example 5 produced parts that had optimum swirled appearance due to the manner in which the second phase was combined with the first phase. Example 4 exhibited insufficient swirl effect. Example 6 exhibited a pattern that was too discreet. Overall, the molded plaques of Example 5 exhibited a camouflage pattern.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
    a first phase comprising a polyoxymethylene polymer having a melting point; and
    a second phase that is immiscible with the first phase,
        wherein the second phase comprises a colorant and a thermoplastic, semi-crystalline polymer having a melting point that is at least 5° C. higher than the melting point of the polyoxymethylene polymer, and
        wherein the colorant is present in an amount greater than 30% by weight based upon the weight of the second phase.
2. The polymer composition of claim 1, wherein the colorant comprises an inorganic pigment.
3. The polymer composition of claim 1, wherein the colorant is present in an amount greater than 40% by weight based upon the weight of the second phase.
4. The polymer composition of claim 1, wherein the colorant is present in an amount from about 30% by weight to about 60% by weight based upon the weight of the second phase.
5. The polymer composition of claim 1, wherein the colorant is present in an amount from about 40% by weight to about 60% by weight based upon the weight of the second phase.
6. The polymer composition of claim 1, wherein the second phase is present in the polymer composition in an amount of from about 1% to about 5% by weight.
7. The polymer composition of claim 1, wherein the thermoplastic, semi-crystalline polymer contained in the second phase comprises a thermoplastic elastomer.
8. The polymer composition of claim 1, wherein the thermoplastic, semi-crystalline polymer contained in the second phase comprises a polyamide or a glycol-modified polyethylene terephthalate.
9. The polymer composition of claim 1, wherein the melting point of the thermoplastic, semi-crystalline polymer is at least 10° C. higher than the melting point of the polyoxymethylene polymer.
10. The polymer composition of claim 1, wherein the polyoxymethylene polymer is present in the composition in an amount of at least about 70% by weight.
11. The polymer composition of claim 1, wherein the polyoxymethylene polymer has a melting point of from about 150° C. to about 200° C.
12. The polymer composition of claim 1, wherein the polyoxymethylene polymer has a melting point of from about 160° C. to about 180° C. and the thermoplastic, semi-crystalline polymer has a melting point of from about 190° C. to about 200° C.
13. The polymer composition of claim 1, wherein the immiscible phases create a swirl-like or marble-like appearance.
14. The polymer composition of claim 1, wherein the second phase comprises discrete domains within a matrix formed by the first phase.
15. A polymer composition comprising:
    a first phase comprising a polyoxymethylene polymer having a melting point; and
    a second phase that is immiscible with the first phase,
        wherein the second phase comprises a colorant and a thermoplastic, semi-crystalline polymer having a melting point from about 170° C. to about 210° C.,
        wherein the melting point of the thermoplastic, semi-crystalline polymer is at least 5° C. higher or lower than the melting point of the polyoxymethylene polymer, and
        wherein the colorant is present in an amount greater than 30% by weight based upon the weight of the second phase.
16. The polymer composition of claim 15, wherein the melting point of the thermoplastic, semi-crystalline polymer is from about 10° C. to about 30° C. higher or lower than the melting point of the polyoxymethylene polymer.
17. The polymer composition of claim 15, wherein the second phase is present in the polymer composition in an amount of from about 1% to about 5% by weight and wherein the colorant is present in the second phase in an amount from about 30% by weight to about 60% by weight.

18. A polymer composition comprising:
- a first phase comprising a polyoxymethylene polymer having a melting point of from about 150° C. to about 200° C. wherein the polyoxymethylene polymer is present in the composition in an amount of at least about 70% by weight; and
- a second phase that is immiscible with the first phase, wherein the second phase comprises a colorant and a thermoplastic, semi-crystalline polymer having a melting point from about 170° C. to about 210° C., wherein the melting point of the polyoxymethylene polymer is lower than the melting point of the thermoplastic, semi-crystalline polymer, and wherein the colorant comprises an inorganic pigment in an amount greater than 30% by weight based upon the weight of the second phase.

19. The polymer composition of claim 18, wherein the thermoplastic, semi-crystalline polymer contained in the second phase comprises a thermoplastic elastomer, a polyamide, or a glycol-modified polyethylene terephthalate.

20. The polymer composition of claim 18, wherein the polyoxymethylene polymer has a melting point of from about 160° C. to about 180° C. and the thermoplastic, semi-crystalline polymer has a melting point of from about 190° C. to about 200° C.

* * * * *